United States Patent [19]
Schmitt et al.

[11] 4,242,469
[45] Dec. 30, 1980

[54] CONTROLLING GRAFTED ELASTOMERS IN BLENDS WITH RESINOUS COPOLYMERS

[75] Inventors: Joseph M. Schmitt, Ridgefield; Richard J. Quinn, Bethel, both of Conn.

[73] Assignee: CY/RO Industries, Stamford, Conn.

[21] Appl. No.: 943,606

[22] Filed: Sep. 18, 1978

[51] Int. Cl.³ .................. C08L 51/04; C08L 53/02
[52] U.S. Cl. .................. 525/71; 260/29.6 XA; 260/29.6 RW; 260/29.7 W; 260/29.7 UP; 525/63; 525/66; 525/72; 525/76; 525/80; 525/84; 525/86; 525/87

[58] Field of Search .................. 260/876 R, 29.6 XA, 260/29.6 RW, 29.7 UP, 29.7 W; 525/63, 66, 71, 72, 76, 80, 84, 86, 87

[56] References Cited

U.S. PATENT DOCUMENTS

| | | | |
|---|---|---|---|
| 3,261,887 | 7/1966 | Mann | 260/876 R |
| 3,354,238 | 11/1967 | Schmitt et al. | 260/876 R |
| 3,509,238 | 4/1970 | Aubrey et al. | 260/876 R |
| 3,849,358 | 11/1974 | Inowe et al. | 260/880 R |

Primary Examiner—J. Ziegler
Attorney, Agent, or Firm—Bruce F. Jacobs

[57] ABSTRACT

Grafted elastomers produced by a multiple grafting technique are blended with a resinous polymer to yield compositions which have low odor, low taste-transfer, and improved optical properties.

22 Claims, No Drawings

CONTROLLING GRAFTED ELASTOMERS IN BLENDS WITH RESINOUS COPOLYMERS

It has been known to prepare thermoplastic molding compositions from various polymers and rubber latices by blending the polymers with the grafted rubber or by polymerizing the monomers used to produce the polymer in the presence of the rubber. For example, U.S. Pat. No. 3,354,238 discloses such a molding composition wherein the resinous phase is composed of methylmethacrylate, styrene and acrylonitrile, and the rubber phase is composed of polybutadiene grafted with methylmethacrylate, styrene and acrylonitrile. Similarly, U.S. Pat. No. 3,261,887 discloses a molding composition substantially identical to that of the above-discussed patent except that the acrylonitrile is omitted therefrom. Also, similarly, U.S. Pat. No. 4,085,116 discloses molding compositions wherein the acrylonitrile has been replaced by ethylacrylate.

These products exhibit acceptable properties when utilized as colored molding compositions, but have deficiencies when used in the absence of a coloring agent. In their uncolored states the products are not sufficiently transparent and, as a result, their use in such as packaging applications has been restricted.

Research has indicated that the optical properties of the molding compositions improve when the rubbery reinforcing elastomer, i.e. the polybutadiene phase in the above patents, is more uniformly distributed in the resinous polymer phase and the agglomerations of the elastomer, if any, are smaller than the wavelength of visible light. The smaller the agglomerations, the better are the optical properties.

While the wavelength of visible light is about 4000 to 7000 Angstroms and the polybutadiene previously used has generally had a diameter on the order of less than 2000 Angstroms, the resultant products have still not been entirely satisfactory due to relatively poor haze and gloss characteristics.

U.S. Ser. No. 943,605, now abandoned filed on even date herewith discloses the use of a physical mixture of two grafted elastomers to improve the optical properties of two phase plastic systems. U.S. Ser. No. 943,604 filed on even date herewith discloses the use of a sequential and controlled addition of monomers process to make a grafted elastomer which improves the optical properties of the same systems. The present invention is a modification and improvement over the above inventions.

It has now been discovered that by using a multiple grafting procedure, a molding composition results having improved optical properties, improved physical properties, and eliminates the need for a difficult intimate mixing step when using two different rubber-to-monomer ratio grafted rubbers.

Furthermore, the resultant molding composition has an even more improved dispersion of the rubbery phase in the resin phase, as well as low odor and low taste-transfer.

The present invention provides improved molding compositions for two phase plastic systems. Examples of the rubbery reinforcing portion of such systems include such as polybutadienes, poly(styrene/butadienes), poly(methylmethacrylate/butadienes), polyisoprenes, polyisobutylenes, poly(isobutyleneisoprene) copolymers, poly(acrylonitrile/butadienes), polyacrylates, polyurethanes, neoprene, silicone rubbers, chlorosulfonated polyethylene, ethylene-propylene rubbers and other such rubbery materials.

Grafted onto the above rubbers may be the monomers detailed below for the resin phase. The monomers to be grafted must be compatible with the particular monomers used in the resin phase for a particular composition. Preferably, the same monomers are used in both. By "compatible" is meant polymers which show a strong affinity for each other such that they may be dispersed into one another in small domain sizes. The smaller the domain sizes, the more compatible are the polymers. Further details of compatibility are disclosed in Advances in Chemistry Series, No. 99, "Multi-Component Polymer Systems," edited by R. F. Gould, 1971, incorporated herein by reference.

The resin phase is any polymer or copolymer which is compatible with the grafted rubber phase. Examples of suitable monomers include: acrylates, methacrylates, nitriles, styrenes, vinyl ethers, vinyl halides, and other similar mono-vinyl compounds. Particularly suitable monomers include methylacrylate, ethylacrylate, propylacrylate, methylmethacrylate, ethylmethacrylate, polymethacrylate, acrylonitrile, methacrylonitrile, styrene, α-methylstyrene, butyl vinyl ether, and vinyl chloride.

Preferably, for this invention, the rubber phase is polybutadiene grafted with methylmethacrylate, styrene and optionally a third monomer selected from methylacrylate, ethylacrylate or acrylonitrile. Preferably, the resin phase is a polymer of methylmethacrylate, styrene, and optionally a third monomer selected from methylacrylate, ethylacrylate and acrylonitrile.

Most preferably, the molding compositions are preferred from a graft polybutadiene phase and a polymeric resin phase where the polybutadiene fraction of the graft polybutadiene phase is 5 to 25% by weight of the total molding composition. The polymeric resin phase contains from about 60 to 80 parts of methylmethacrylate, 15 to 30 parts of styrene and 0 to 15 parts of either methylacrylate, ethylacrylate or acrylonitrile. The graft polybutadiene phase is polybutadiene latex grafted with methylmethacrylate, styrene and optionally either methylacrylate, ethylacrylate or acrylonitrile where the overall ratio of polybutadiene to graft monomers ranges from about 1:1 to about 6:1. The graft monomers are used in a ratio of from about 60 to 85 parts of methylmethacrylate, 15 to 30 parts of styrene and 0 to 15 parts of either methylacrylate, ethylacrylate or acrylonitrile.

The grafting technique consists of at least two graft stages run in succession by the addition of the rubber and grafting monomers, followed by more rubber, and more grafting monomers. The grafting procedure used in each stage is either a rubber with equilibrated monomer as in U.S. Pat. No. 4,085,166 or a sequential and controlled addition of monomers as in U.S. Ser. No. 943,604. To the first stage graft product is added about 0.5–1.0% (based on second stage rubber latex weight) of a stabilizer such as potassium lauryl aryl sulfonate to ensure latex stability during the second stage polymerization. For further stages, further stabilizers may be added. The ratios of monomers, preferably methylmethacrylate, styrene and either methylacrylate, ethyl acrylate or acrylonitrile used in the individual grafting stages are the same as given above in the overall graft composition. The ratio of rubber to monomer in the individual grafting stages is bounded by the overall graft compositions given above, i.e., from about 1:1 to about 6:1.

The prime restriction on stage compositions is that each stage graft product by weight be at least as large as the earlier produced grafted rubbers. In a two stage system, the second stage preferably is at least 60% of the product and most preferably, about 65 to 95%. When calculating the subsequent stage graft rubber product weight, the subsequent stage monomers are assumed to be equally distributed among the previous and new stage rubbers and the previous stage resin (graft monomer).

The compositions may be produced by blending the resinous phase, which may be prepared by a free radical initiated reaction in the presence of a solvent and in a two-stage system whereby the monomer blend is charged to a first reactor and polymerized to about 20 to 40% solids and then in a second reactor where complete conversion is carried out, with the rubbery phase in the appropriate amounts.

Any known procedure may be utilized to produce the resin phase. It is preferred, however, that the resin phase be produced by blending the appropriate concentration of monomers in a solvent such as toluene at about a 60 to 80% monomers concentration. A suitable initiator such as benzoyl peroxide, di-t-butyl peroxide and the like may be added in the presence of a molecular weight control additive such as an alkyl mercaptan e.g., n-dodecyl mercaptan, n-octyl mercaptan, t-dodecyl mercaptan, benzyl mercaptan and the like. As mentioned above, this polymerization is preferably conducted in a two-stage system whereby the monomer solution is charged to the first stage reactor and polymerized at from about 80° to 110° C. for from about 12 to 24 hours. The rate of conversion is preferably adjusted to from about 1 to 3% solids per hour. The first stage polymer is then preferably transferred to a second stage such as a plug flow reactor where complete conversion of the monomer to polymer is carried out. The final solids content generally ranges from about 60 to 70%. Initiators may be used in amounts ranging from about 0.01 to 5.0 percent by weight, based on the weight of the monomers. The molecular weight control additive can be used in like amounts, by weight, again based on the weight of the monomers.

There may be added to the resin phase, after or during formation, such additives as heat and light stabilizers, antioxidants, lubricants, plasticizers, pigments, fillers, dyes and the like.

The grafted rubber phase is prepared by a multiple stage grafting procedure wherein each stage may be either a conventional grafting process or a sequential and controlled addition of monomer (SCAM) process. Preferably, at least one of the stages is a SCAM process, and most preferably two stages are used with each being a SCAM process. While graftings may be done in a series of reactors, it has been found convenient to use a single reactor with the graftings done in succession.

This procedure results in a large number of individual grafted rubber particles with essentially no agglomeration and/or aggregation of the rubber particles. This results in improved optical properties as well as a composition having reduced taste and odor transfer characteristics.

In the SCAM process, which is essentially a standard free radical initiation polymerization, at least the monomer having the best compatibility to that of the resin phase being used is sequentially added in a controlled manner to the rubber latex and other monomers which are being grafted onto the rubber. Conventional initiators and other polymerization components are used.

In the SCAM procedure, the monomer being sequentially added should be added over a period of at least 15 minutes, preferably at least 1 hour, and most preferably about 1 to 3 hours, with the grafting reaction occurring during the addition and preferably allowed to continue thereafter for about one hour. The initiator which is preferably a redox type may be included in the reactor initially, it may be added simultaneously as the monomer being added either in the same stream or in a separate stream; or ultraviolet light may be used. Generally, the initiator is used in an amount up to about four times the standard amounts as used in U.S. Pat. No. 4,085,166. When a redox initiator is to be controllably added, (as opposed to being in the reactor initially, either the oxidant or reductant portion may be placed in the reactor initially and only the other portion need be controllably added. The reaction is conducted at a pH range of about 6.0 to 8.5 and in the temperature range of about 20° to 65° C., though neither has been found to be critical to the present invention.

Examples of suitable redox initiator systems include: t-butyl hydroperoxide, cumene hydroperoxide, hydrogen peroxide or potassium persulfate-sodium formaldehyde sulfoxylate-iron; hydroperoxides-tetraethylene pentamine or dihydroxyacetone; hydroperoxides-bisulfite systems; and other such well known redox initiators.

The rubber-to-monomer ratios of the graft polymerizations, be they conventional or SCAM, may be varied as desired to control the rubber-to-monomer ratios so as to produce the desired balance of properties in the final product. Hence, it is the desired final product which determines the actual ratios to be used in making the graft polymerizations. Generally, the rubber-to-monomer ratios should be in the range of about 1:1 to as high as about 6:1, with the lower ratio materials providing the better optical properties and the higher ratio materials the better physical properties. Preferably one portion of the graft products has a rubber-to-monomer ratio of at least 2.5:1, and the other less than 2:1. Most preferably, one has a ratio of about 2.5:1 to 4:1, and the other from about 1:1 to 2:1.

The multiple-graft polymerizations of the present invention provide a more intimate blending of different rubber-to-monomer ratio rubbery phases than was heretofore possible. Different rubber-to-monomer ratios are readily obtained even when the same ratio of rubber to monomer is added in each stage, due to the first grafted rubber being in the reactor when the next graft is performed.

For example, an intimate blend of a 3:1 and a 1:1 rubber:monomer may be prepared from two 2:1 graftings as follows:

Graft 1 uses a total of three parts by weight reactants—2 parts rubber and 1 part monomers—to produce a 2:1 product. Thereafter, a second graft is performed using nine parts reactants—6 parts rubber and 3 parts monomers—together with the first graft product. In the second graft, the new monomers will be attracted to the first product and the newly added rubber essentially in the ratio in which these are present in the reactor. Hence, in this example, 6/9 of the 3 parts newly added monomers will graft onto the new rubber, i.e., 6 parts rubber to 2 parts monomer—a 3:1 ratio, and 3/9 will graft onto the previous graft, i.e., 2 parts rubber to 1 part first monomers plus 1 part new monomer—a 1:1 ratio. Thus, the resultant mixed graft will contain 4 parts of a 1:1 graft and 8 parts of a 3:1 graft which are intimately admixed.

The resinous phase and the rubbery phase may be blended together in any any known manner such as by utilizing a ball mill, hot rolls, emulsion blending or the like.

It is preferred that the blending operation be carried out in a devolatilizer-extruder in a manner described at column 3, lines 3 to 72 of the above-mentioned U.S. Pat. No. 3,354,238, which section thereof is hereby incorporated herein be reference.

As mentioned above, the compositions of the instant invention have utility where toughness, rigidity and transparency are necessary and may be utilized in the injection molding of highly engineered parts, blow molding and thermoforming of containers or other desired articles.

The following examples are set forth for purposes of illustration only and are not to be construed as limitations on the present invention except as set forth in the appended claims. All parts and percentages are by weight unless otherwise indicated.

EXAMPLE 1

A 71.5/23.5/5.0 methylmethacrylate/styrene/ethylacrylate terpolymer composition is prepared by polymerizing the following monomer-solvent blend:

51.6 parts methylmethacrylate
17.0 parts styrene
3.6 parts ethylacrylate
27.5 parts toluene
0.022 part n-dodecylmercaptan
0.30 part di-t-butylperoxide The polymerization is carried out in a two-stage system, i.e., the monomer-solvent blend is charged to a first stage reactor and polymerized to about 28 to 30% solids at 90°–95° C. for about 15 hours. The rate of conversion is about 2% solids per hour. The first stage reaction product is then transferred to a plug flow reactor where complete conversion of monomer to polymer is carried out. The final solids content is near 72%.

A graft rubber composition is prepared by a two-stage grafting polymerization as follows:

A first grafted rubber composition is prepared by blending 100 parts of polybutadiene in latex form with 40 parts of methylmethacrylate and 10 parts of styrene. The rubber to monomer ratio is 2 to 1. The monomers are then grafted onto the polybutadiene by a redox initiated polymerization using, based on monomer, 0.1 part of t-butylhydroperoxide, 0.23 part sodium formaldehyde sulfoxylate, 27 ppm ferric chloride.6 $H_2O$ and 127 ppm ethylene diamine tetraacetic acid—4Na salt at room temperature for 1 to 5 hours.

The second graft is prepared by placing the first graft of above in a reactor, adding 6.7 g. of potassium lauryl aryl sulfonate, and then blending in 300 parts of polybutadiene in latex form, 120 parts of methylmethacrylate, 30 parts of styrene, and the like amounts of the initiator system of above. The second rubber to second monomer ratio in this stage is 2:1. The grafting reaction is run at room temperature for 1–5 hours with constant agitation.

In this example, the mixed grafted polybutadiene phase contains, by calculation, 1 part of a 1:1 graft for every 2 parts of a 3:1 graft wherein the grafts are intimately mixed. The overall rubber to monomer ratio is 2:1.

21.75 Parts of the above grafted rubber are then blended with 78.25 parts of the above terpolymer so as to provide a final polybutadiene content of 14.5%. The blending is conducted on a devolatilizer-extruder at a temperature on the inlet end of about 250° F. and at the die end of about 560° F. under a vacuum of 25–27 in Hg.

The resultant composition may then be formed into various specimens and tested for physical and optical properties. Superior optical properties are noted as compared to a conventionally prepared product wherein the grafted rubber is prepared from a 3:1 rubber-to-monomer single stage reaction as disclosed in U.S. Pat. No. 4,085,166.

EXAMPLE 2

The procedure of Example 1 is repeated until the grafting polymerizations which are preformed as follows:

A first grafted rubber composition is prepared by blending 325 parts of polybutadiene in latex form with 133 parts of methylmethacrylate and 33 parts of styrene. The rubber to monomer ratio is 1.963:1. The monomers are then grafted onto the polybutadiene by a redox initiated polymerization using, based on monomer, 0.33 part of t-butylhydroperoxide, 0.66 part of sodium formaldehyde sulfoxylate, 88 ppm ferric chloride.6$H_2O$, and 408 ppm of ethylenediamine tetraacetic acid—4Na salt at room temperature overnight. The maximum exotherm was reached in 36 minutes. The solids content of the first stage is 45.1%.

The first grafted product is placed in a reactor along with 17.48 parts of sodium lauryl aryl sulfonate and then 1646 parts of polybutadiene in latex form (44.8% solids, 737 parts polybutadiene) and deionized water. The pH is adjusted to about 8.3 with 1.5% aqueous ammonia. To this is charged 56 parts of styrene with stirring and the equilibrating mixture is purged with nitrogen to provide a near oxygen-free atmosphere. Then 37 parts of sodium formaldehyde sulfoxylate chelate solution of the following composition is added:

| | |
|---|---|
| 96.25% | deionized water |
| 3.51% | sodium formaldehyde sulfoxylate |
| 0.19% | ethylenediamine tetraacetic acid tetra sodium salt |
| 0.04% | ferric chloride hexahydrate |
| 100 % | |

After five minutes and continuing the stirring, 222 parts of methyl methacrylate and 32.8 parts of tert-butyl hydroperoxide solution 1.7% t-butyl hydroperoxide and 98.3% deionized water) are pumped into the reactor. The methylmethacrylate rate is 1.85 part per minute for 2 hours. The t-butylhydroperoxide solution rate is 1.64 part per minute for 10 minutes, then 0.1367 part per minute for 120 minutes. The second rubber to second monomer ratio in this second stage is 2.666:1. One hour after the monomer addition is completed the conversion to polymer is 98–99%. The final solids are about 47%.

In this example, the mixed grafted polybutadiene phase contains by calculation 1 part of a 1.13:1 graft for every 2 parts of a 4:1 graft which are intimately mixed. The overall rubber to monomer ratio is 2.45:1.

20.4 Parts of the above grafted rubber are then blended with 79.6 parts of the above terpolymer so as to provide a final polybutadiene content of 14.5%. The blending is conducted on a devolalitizer-extruder at a temperature on the inlet end of about 250° F. and at the die end of about 560° F. under a vacuum of 25-27 in Hg.

The resultant transparent composition is then formed into various specimens and tested. The physical and optical properties were as follows:
Notched Izod, fppi: 2.14
Gloss %, 20°: 56
Gloss %, 60°: 81

EXAMPLES 3-6

The procedure of Example 1 is repeated except that in the second grafting polymerization 0.4 part of sodium formaldehyde sulfoxylate, 89 ppm ferric chloride.6H$_2$O and 407 ppm ethylene diamine tetracetic acid—4Na are used and the first grafting polymerization is performed by a SCAM procedure as follows:

A graft rubber composition is prepared by charging 225 parts of polybutadiene latex (44.5% solids, 100 parts of polybutadiene) and 25 parts of deionized water to a reactor, and adjusting the pH to about 8.3 with 1.5% aqueous ammonia. To this is charged 10 parts of styrene with stirring and the equilibrating mixture is purged with nitrogen to provide a near oxygen-free atmosphere. Then 6.6 parts of sodium formaldehyde sulfoxylate chelate solution of Example 2 is added. After five minutes and continuing the stirring, 40 parts of methyl methacrylate and 4.69 parts of tert-butyl hydroperoxide solution (2.13% t-butyl hydroperoxide and 97.87% deionized water) are pumped into the reactor. The methylmethacrylate rate is 0.6667 part per minute for 1 hour. The t-butylhydroperoxide solution rate is 0.235 part per minute for 10 minutes, then 0.0391 part per minute for 60 minutes.

The above procedure is repeated except that the styrene is pumped in together with the methylmethacrylate.

21.75 and 24.75 parts of each of the above grafted rubbers are then blended with 78.25 and 75.25 parts, respectively, of the above terpolymer so as to provide final polybutadiene contents of 14.5% and 16.5%. The blending is conducted on a devolalitizer-extruder at a temperature on the inlet end of about 250° F. and at the die end of about 560° F. under a vacuum of 25-27 in Hg.

The resultant transparent compositions are then formed into various specimens and tested. The results are as detailed below in Table I.

TABLE I

| Example | % Polybutadiene in Blend | Styrene Pumped | Notched Izod[1] fppi | Gloss,%[2] 20° | 60° |
|---|---|---|---|---|---|
| 3 | 14.5 | No | 1.5 | 51 | 81 |
| 4 | 16.5 | No | 2.0 | 48 | 80 |
| 5 | 14.5 | Yes | 2.1 | 47 | 79 |
| 6 | 16.5 | Yes | 2.4 | 46 | 70 |

[1]ASTM 256, Method A
[2]ASTM 2457

EXAMPLE 7

The procedure of Example 1 is repeated to prepare the resinous polymer. The grafted rubber is prepared as follows:

A first grafted rubber composition is prepared by charging 151 parts of polybutadiene latex (44.8% solids, 67.65 parts of polybutadiene) and 19.5 parts of deionized water to a reactor and adjusting the pH to about 8.3 with 1.5% aqueous ammonia. To this is charged 6.8 parts of styrene with stirring and the equilibrating mixture is purged with nitrogen to provide a near oxygen-free atmosphere. Then 4.48 parts of the sodium formaldehyde sulfoxylate chelate solution of Example 2 is added. After five minutes and continuing the stirring, 27.1 parts of methylmethacrylate and 10 parts of tert-butyl hydroperoxide solution (0.678% t-butylhydroperoxide and 99.322% deionized water) are pumped into the reactor. The methylmethacrylate rate is 0.3985 part per minute for 66 minutes. The t-butyl hydroperoxide solution rate is 0.5 part per minute for 10 minutes and then 0.0833 part per minute for 60 minutes. The rubber to first monomer ratio is 2:1. This product is about 46% solids.

To the first grafted product are added 18.5 parts of a 23% aqueous solution of potassium lauryl aryl sulfonate and 36 parts of deionized water with stirring, then 453 parts of polybutadiene latex (44.8% solids, 203 parts of polybutadiene). The pH is adjusted to about 8.3 with 1.5% aqueous ammonia. To this is charged 20.3 parts of styrene with stirring and the equilibrating mixture is purged with nitrogen to provide a near oxygen-free atmosphere. Then 13.4 parts of sodium formaldehyde sulfoxylate chelate solution of Example 2 is added. After five minutes and continuing the stirring, 81.2 parts of methylmethacrylate and 10 parts of t-butyl hydroperoxide solution (2.03% t-butyl hydroperoxide and 97.97% deionized water) are pumped into the reactor. The methylmethacrylate rate is 1.3533 part per minute for 1 hour. The t-butyl hydroperoxide rate is 0.5 part per minute for 10 minutes, then 0.033 part per minute for 1 hour. The second rubber to second monomer ratio in the second stage is 2:1. The final solids are 47.5%.

In this Example the mixed grafted polybutadiene phase contains by calculation 1 part of a 1:1 graft for every 2 parts of a 3:1 graft which are intimately mixed. The overall rubber to monomer ratio is 2:1.

21.75 parts of the above grafted rubber are then blended with 78.25 parts of the above terpolymer so as to provide a calculated final polybutadiene content of 14.5%. The blending is conducted on a devolalitizer-extruder at a temperature on the inlet end of about 250° F. and at the die end of about 56° F. under a vacuum of 25-27 in. Hg.

The resultant transparent composition is then formed into various specimens and tested. The results are given below in Table II along with results for products produced by the conventional procedure with a rubber to monomer ratio of 3:1 and the procedure of U.S. Ser. No. 943,605, now abandoned by mixing a 3:1 graft rubber with a 1:1 rubber. The percent polybutadiene analyzed represents 80-85% of the polybutadiene present in the composition and the numbers are intended solely for a comparison of relative amounts of polybutadiene actually present.

As can be readily seen from the results, the new process results in improved optical properties over both the conventionally prepared sample and that of the mixed elastomer grafts. The new process also provides a product with impact strengths almost identical to the conventionally prepared material. The superior optical properties are best seen in the thermoformed samples.

TABLE II

| | Conventionally prepared Product | Mixing of Elastomer Grafts | Ex. 7 |
|---|---|---|---|
| % Polybutadiene Analyzed | 14.3 | 12.8 | 11.7 |

TABLE II-continued

|  | Conventionally prepared Product | Mixing of Elastomer Grafts | Ex. 7 |
|---|---|---|---|
| Molded Samples | | | |
| Notched Izod, fppi | 1.8 | 1.1 | 1.4 |
| Dart Impact, fppi[1] | 41.5 | 34.8 | 39.3 |
| Total Z Haze, %[2] | 8.1 | 10.8 | 8.1 |
| Gloss, % | | | |
| 20° | 55 | 61 | 65 |
| 60° | 82 | 85 | 86 |
| Thermoformed Samples[3] | | | |
| Gloss, % | | | |
| 20° | 2 | 13 | 15 |
| 60° | 32 | 59 | 65 |

[1]ASTM 3029m, modified TUP
[2]ASTM 1003
[3]Samples thermoformed at 350°-365° F. in the shape of margarine tubs with outside walls 0.011 in. thick.

EXAMPLE 8

The procedure of Example 7 is repeated except that the first rubber to first monomer ratio is 1.963:1 and the second rubber to second monomer ratio is 2.666:1. Therefore, the mixed polybutadiene phase contains, by calculation, 1 part of a 1.13:1 graft for every 2 parts of a 4:1 graft which are intimately mixed. The overall rubber to monomer ratio is 2.45:1.

The resultant transparent composition is then formed into various specimens and tested. The results are as follows:
Notched Izod, fppi: 2.1
Gloss %, 20°: 57
Gloss %, 60°: 82

EXAMPLE 9

The procedures of Examples 1-7 were repeated, except that the ethylacrylate in the resin portion is replaced by methylacrylate. Similar results are observed.

EXAMPLE 10

The procedures of Examples 1-7 are repeated except that the ethylacrylate in the resin portion is omitted and the ratios of the monomers is varied to compensate for the resultant change in refractive index. Similar results are noted.

EXAMPLE 11

The procedures of Examples 1-7 are repeated except that the polybutadiene latex is replaced by a polyisoprene latex, and the monomer ratios in both the graft and resin phases are varied to compensate for the difference in the rubber refractive index. Comparable results are achieved.

EXAMPLE 12

The procedures of Examples 1-7 are repeated except that 3 parts of methylmethacrylate on the graft polymerizations are replaced by 3 parts of ethylacrylate. Similar results are observed.

EXAMPLE 13

To determine the taste-transfer and odor characteristics of compositions of the present invention as opposed to prior compositions and glass, bottles were made from each material being tested.

For the taste-transfer test water was put in each bottle and allowed to sit at room temperature for one week. At which time, a sample of the water from each bottle was poured into separate glass beakers, drunk by a panel of six participants, and rated by each participant from best (least tast-transfer) to worst (most taste-transfer). The procedure was run in duplicate and the results are summarized in Table III below.

For the odor test, a new bottle of each material is allowed to sit uncapped overnight, then it is capped and allowed to sit at room temperature for one week. Each bottle is uncapped and each of six participants rates the bottles from best (low odor) to worst (high odor). The results are summarized in Table III below.

The following materials were tested:
A. Product of Example 8 except the methyl methacrylate is pumped in for one hour.
B. Same as A but made on a different day.
C. Conventionally prepared material as in U.S. Pat. No. 4,085,116.
D. Conventionally prepared material as in U.S. Pat. No. 3,354,238 wherein the ethylacrylate is replaced by acrylonitrile.
E. Product of Example 7.
F. Glass
G. Same as C, but a different sample.

The results clearly demonstrate greatly reduced taste-transfer and odor for compositions of the present invention (A, B and E) as compared to conventionally prepared materials of the same composition (C and G) as well as to compositions containing acrylonitrile (D).

TABLE III
RESULTS OF EXAMPLE 13

| | Taste-Transfer | Odor |
|---|---|---|
| Best ↑ | E, F | B, E |
| | B, A, D | A, D |
| Worst ↓ | G, C | G, C |

(1) Samples grouped together were indistinguishable in either taste-transfer or odor.
(2) Participants said that the tastes of Sample C and G were especially poor.

What is claimed is:
1. A molding composition characterized by exhibiting superior optical properties, low taste-transfer and low odor comprising:
   (a) a major proportion of a resinous polymeric phase; and
   (b) a minor proportion of a grafted rubbery phase, said rubbery phase being prepared from a rubber and one or more monomers which are grafted thereon and are compatible with said resinous phase, said grafting being performed in a plurality of different rubber-to-monomer ratio rubbery phases within said rubbery phase, the overall ratio of rubber to monomer in said rubbery phase being from about 1:1 to 6:1, and wherein each later grafting stage is performed in the presence of the products of the previous grafting stages by adding thereto additional rubber and one or more monomers.

2. The composition of claim 1 wherein the rubber is polybutadiene in the latex form.

3. The composition of claim 2 wherein the polybutadiene is about 5 to 25 by weight of the composition.

4. The composition of claim 1 wherein the resinous phase is a polymer of methylmethacrylate, styrene, and optionally a monomer selected from methylacrylate, ethylacrylate, and acrylonitrile.

5. The composition of claim 4 wherein the resinous phase is a polymer of about 60 to 80 parts methylmethacrylate, about 15 to 30 parts styrene, and about 0 to 15 parts of a monomer selected from methylacrylate, ethylacrylate, and acrylonitrile.

6. The composition of claim 1 wherein the rubbery phase is polybutadiene grafted with methylmethacrylate, styrene, and optionally a monomer selected from methylacrylate, ethylacrylate, or acrylonitrile.

7. The composition of claim 1 wherein at least one of said plurality of stages of grafting is a sequential and controlled addition during the grafting reaction of at least the monomer having the best compatibility to that of the resinous phase, wherein the addition is for at least 15 minutes and a grafting reaction occurs during said addition.

8. The composition of claim 7 wherein a redox initiator is used.

9. The composition of claim 8 wherein either the reductant or the oxidant portion of the initiator is controllably added at the same time as the monomer which is controllably added.

10. The composition of claim 7 wherein the addition is for at least one hour.

11. The composition of claim 7 wherein the addition is for about 1 to 3 hours.

12. The composition of claim 1 wherein two stages of grafting are used and the rubbery phase contains two different rubber-to-monomer ratio portions.

13. The composition of claims 1 or 12 wherein each stage of grafting is performed by a sequential and controlled addition during the grafting reaction of at least the monomer having the best compatibility to that of the resinous phase, wherein the addition for each stage is for at least 15 minutes, and a grafting reaction occurs during said additions.

14. A molding composition characterized by exhibiting superior optical properties, low taste-transfer and low odor comprising:
   (a) a major proportion of a resinous polymeric phase,
   (b) a minor proportion of two grafted rubbery phases, said rubbery phases each being prepared from a rubber and one or more monomers which are grafted thereon and are compatible with said resinous phase, one of said rubbery phases having a rubber-to-monomer ratio of at least 2.5:1 while the other of said rubbery phases has a rubber-to-monomer ratio of less than about 2.0:1 wherein the rubbery phase having the higher rubber-to-monomer ratio is present in excess of the one having the lower rubber-to-monomer ratio, and is prepared in the presence of the one having the lower rubber-to-monomer ratio by adding thereto additional rubber and one or more monomers.

15. A method of preparing an improved non-agglomerating, readily-dispersible mixture of grafted rubbers comprising performing a series of graft polymerization reactions, each later graft reaction being performed in the presence of the products of the earlier of said graft reactions by adding thereto additional rubber and one or more monomers.

16. The method of claim 15 wherein at least one of the graft polymerizations is a sequential and controlled addition during the grafting reaction of at least one monomer and the controlled addition is for at least 15 minutes during which time the graft polymerization occurs.

17. The method of claim 16 wherein a redox initiator is used.

18. The method of claim 17 wherein either the reductant or the oxidant portion of the initiator is controllably added at the same time as the monomer which is controllably added.

19. The method of claim 16 wherein one or more other graftable monomers are placed in the reaction vessel along with the rubber latex.

20. The method of claim 19 wherein said other graftable monomers are styrene and optionally a monomer selected from the group consisting essentially of methylacrylate, ethylacrylate, and acrylonitrile.

21. The method of claim 16 wherein the rubber latex is polybutadiene and the monomer controllably added is methylmethacrylate.

22. A method of preparing an improved low-odor, low taste-transfer molding composition comprising blending:
   (a) a major proportion of a resinous polymeric base,
   (b) a minor proportion of two grafted rubbery phases, said rubbery phases each being prepared from a rubber and one or more monomers which are grafted thereon and are compatible with said resinous phase, one of said rubbery phases having a rubber-to-monomer ratio of at least 2.5:1 while the other of said rubbery phases has a rubber-to-monomer ratio of less than about 2.0:1 wherein the rubbery phase having the higher rubber-to-monomer ratio is present in excess of the one having the lower rubber-to-monomer ratio, and is prepared in the presence of the one having the lower rubber-to-monomer ratio by adding thereto additional rubber and one or more monomers.

* * * * *